(12) United States Patent
Blevins et al.

(10) Patent No.: US 7,620,460 B2
(45) Date of Patent: *Nov. 17, 2009

(54) PROCESS CONTROL WITH UNRELIABLE COMMUNICATIONS

(75) Inventors: Terrence L. Blevins, Round Rock, TX (US); Deji Chen, Williamson, TX (US); Mark J. Nixon, Round Rock, TX (US); Gregory K. McMillan, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 194 days.

This patent is subject to a terminal disclaimer.

(21) Appl. No.: 11/499,013

(22) Filed: Aug. 4, 2006

(65) Prior Publication Data

US 2007/0112905 A1 May 17, 2007

Related U.S. Application Data

(63) Continuation-in-part of application No. 11/258,676, filed on Oct. 25, 2005.

(51) Int. Cl.
*G05B 13/02* (2006.01)
(52) U.S. Cl. .......................... 700/29; 700/45
(58) Field of Classification Search ............. 700/29–31, 700/40–45
See application file for complete search history.

(56) References Cited

U.S. PATENT DOCUMENTS 3,628,129 A * 12/1971 Riley ........................... 73/199

| 5,268,834 | A | 12/1993 | Sanner et al. |
| 5,268,835 | A | 12/1993 | Miyagaki et al. |
| 5,477,449 | A | 12/1995 | Lino et al. |
| 6,094,602 | A | 7/2000 | Schade, III |
| 6,298,454 | B1 | 10/2001 | Schleiss et al. |
| 6,437,692 | B1 | 8/2002 | Petite et al. |
| 7,158,851 | B2 * | 1/2007 | Funk ........................... 700/121 |
| 2003/0043052 | A1 | 3/2003 | Tapperson et al. |

(Continued)

FOREIGN PATENT DOCUMENTS

GB 2 431 752 A 5/2007

(Continued)

OTHER PUBLICATIONS

Montestruque, L.A. and Antsaklis, P. "Stability of Model-Based Networked Control Systems With Time-Varying Transmission Times". IEEE Transactions on Automatic Control 49.9 (Sept. 2004): 1562-1572.*

(Continued)

*Primary Examiner*—Ryan A Jarrett
(74) *Attorney, Agent, or Firm*—Marshall, Gerstein & Borun LLP

(57) ABSTRACT

Disclosed are methods and devices for controlling a process with a control signal. Iterations of a control routine are implemented to generate the control signal, and when an indication of a response to the control signal is unavailable, a feedback contribution to the control signal is maintained over one or more of the iterations of the control routine. The feedback contribution is then modified upon receiving the response indication, in which the feedback contribution is determined in accordance with an elapsed time between the received response indication and a previous communication of the response indication.

26 Claims, 8 Drawing Sheets

U.S. PATENT DOCUMENTS

| | | | |
|---|---|---|---|
| 2003/0149493 | A1 | 8/2003 | Blevins et al. |
| 2006/0079967 | A1 | 4/2006 | Roby et al. |
| 2007/0093918 | A1 | 4/2007 | Blevins et al. |

FOREIGN PATENT DOCUMENTS

| | | |
|---|---|---|
| GB | 2 440 167 | 1/2008 |

OTHER PUBLICATIONS

Montestruque, L.A. and Antsaklis, P. "On the Model-Based Control of Networked Systems". Automatica 39 (Feb. 2003): 1837-1843 (hereinafter referred to as "Montestruque-B").*

"Competency in Process Control—Industry Guidelines," *En Tech Control Engineering Inc.*, Version 1.0, (1994).

"Configuring CL6010, CL6210, and CL7010 Series Interactive and Computing Controllers, FG4.2:CL6011," *Fisher Controls publication*, pp. 6-46 (1985).

"The En Tech Report," http://www.emersonprocess.com/solutions/services/entech/publications/index.asp, pp. 1-4 (Oct. 24, 2005).

Liptak, Bela G., "Sample -and hold Algorithms," *Instrument Engineers Handbook*, Third Edition, Process Control, p. 29 (1995).

Shinskey, F. Greg, "The Power of External-Reset Feedback," *Control*, pp. 53-63 (May 2006).

Shinskey, F.G., "Sampled Integral Controller," *Feedback Controllers for the Process Industry*, p. 93 (1994).

Shinskey, F.G., "Sampling Controllers," *Process Control Systems*, Third Edition, pp. 161-162 ((1988).

Wei, Yang, "Implementation of IEC61499 Distributed Function Block Architecture for Industrial Measurement and Control Systems (IPMCS)," *National University of Singapore, Department of Electrical & Computer Engineering*, (2001/2002).

Aspentech, "Analysis of Data Storage Technologies for the Management of Real-Time Process Manufacturing Data," Analysis of Information Management, Retrieved from the Internet Aug. 17, 2007: URL htt ://www.aspentech.com/publication_files/White_Paper_for_IP_21.pdf.

Caro, "Wireless Networks for Industrial Automation," *ISA* (2004).

Chen, "Real-Time Data Management in the Distributed Environment," Ph.D. Thesis, University of Texas at Austin (1999).

EnTech Control Engineering Inc., "Automatic Controller Dynamic Specification," Available at: URL http://www.emersonprocess.com/entechcontrol/download/publications/control.pdf.

Freescale Semiconductor,"Welcome to Freescale Semiconductor,"Retrieved from Internet on Aug. 17, 2007: URL http://www.freescale.com/.

Hieb, "Developing a Small Wireless Control Network," Master's Thesis, University of Texas at Austin (2003).

IEEE, "IEEE Wireless Standards Zone," Retrieved from Internet on Aug. 17, 2007: URL http://standards.ieee.org/wireless/.

Johnson, "Vital Link to Process Control," *Control Engineering*, 52(10) (2005).

Search Report for Application No. GB0620420.0, dated Feb. 12, 2007.

Search Report for Application No. GB0620421.8, dated Feb. 2, 2007.

Search Report for Application No. GB0816097.0, dated Oct. 24, 2008.

Search Report for Application No. EP08163662.3, dated Jan. 26, 2009.

U.S. Appl. No. 11/258,676, filed Oct. 25, 2005.

U.S. Appl. No. 11/850,810, filed Sep. 6, 2007.

\* cited by examiner

PROCESS CONTROL WITH UNRELIABLE COMMUNICATIONS

CROSS-REFERENCE TO RELATED APPLICATION

This application is a continuation-in-part of the application entitled "Non-periodic Control Communications in Wireless and Other Process Control Systems," filed Oct. 25, 2005, and assigned Ser. No. 11/258,676, the entire disclosure of which is hereby expressly incorporated by reference.

TECHNICAL FIELD

The present invention relates generally to process control systems and, more particularly, to the transmission and processing of wireless and/or non-periodic control communications in process control systems.

DESCRIPTION OF THE RELATED ART

Process control systems, such as distributed or scalable process control systems like those used in chemical, petroleum or other processes, typically include one or more process controllers communicatively coupled to each other, to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, and uses this information to implement a control routine to generate control signals which are sent over the buses to the field devices to control the operation of the process. Information from the field devices and the controller is typically made available to one or more applications executed by the operator workstation to enable an operator to perform any desired function with respect to the process, such as viewing the current state of the process, modifying the operation of the process, etc.

Some process control systems, such as the DeltaV® system sold by Fisher Rosemount Systems, Inc., headquartered in Austin, Tex., use function blocks or groups of function blocks referred to as modules located in the controller or in different field devices to perform control operations. In these cases, the controller or other device is capable of including and executing one or more function blocks or modules, each of which receives inputs from and/or provides outputs to other function blocks (either within the same device or within different devices), and performs some process operation, such as measuring or detecting a process parameter, controlling a device, or performing a control operation, such as the implementation of a proportional-derivative-integral (PID) control routine. The different function blocks and modules within a process control system are generally configured to communicate with each other (e.g., over a bus) to form one or more process control loops.

Process controllers are typically programmed to execute a different algorithm, sub-routine or control loop (which are all control routines) for each of a number of different loops defined for, or contained within a process, such as flow control loops, temperature control loops, pressure control loops, etc. Generally speaking, each such control loop includes one or more input blocks, such as an analog input (AI) function block, a single-output control block, such as a proportional-integral-derivative (PID) or a fuzzy logic control function block, and an output block, such as an analog output (AO) function block. Control routines, and the function blocks that implement such routines, have been configured in accordance with a number of control techniques, including PID control, fuzzy logic control, and model-based techniques such as a Smith Predictor or Model Predictive control (MPC).

To support the execution of the routines, a typical industrial or process plant has a centralized control room communicatively connected with one or more process controllers and process I/O subsystems, which, in turn, are connected to one or more field devices. Traditionally, analog field devices have been connected to the controller by two- or four-wire current loops for both signal transmission and the supply of power. An analog field device that transmits a signal to the control room (e.g., a sensor or transmitter) modulates the current running through the current loop, such that the current is proportional to the sensed process variable. On the other hand, analog field devices that perform an action under control of the control room is controlled by the magnitude of the current through the loop.

More recently, field devices superimpose digital data on the current loop used to transmit the analog signals. For example, the Highway Addressable Remote Transducer (HART) protocol uses the loop current magnitude to send and receive analog signals, but also superimposes a digital carrier signal on the current loop signal to enable two-way field communication with smart field instruments. Another protocol generally referred to as Fieldbus defines two sub-protocols, one supporting data transfers at a rate up to 31.25 kilobits per second while powering field devices coupled to the network, and the other supporting data transfers at a rate up to 2.5 megabits per second without providing any power to field devices. With these types of communication protocols, smart field devices, which are typically all digital in nature, support a number of maintenance modes and enhanced functions not provided by older control systems.

With the increased amount of data transfer, one particularly important aspect of process control system design involves the manner in which field devices are communicatively coupled to each other, to controllers and to other systems or devices within a process control system or a process plant. In general, the various communication channels, links and paths that enable the field devices to function within the process control system are commonly collectively referred to as an input/output (I/O) communication network.

The communication network topology and physical connections or paths used to implement an I/O communication network can have a substantial impact on the robustness or integrity of field device communications, particularly when the network is subjected to adverse environmental factors or harsh conditions. These factors and conditions can compromise the integrity of communications between one or more field devices, controllers, etc. The communications between the controllers and the field devices are especially sensitive to any such disruptions, inasmuch as the control routines typically require periodic updates of the process variables for each iteration of the routine. Compromised control communications could therefore result in reduced process control system efficiency and/or profitability, and excessive wear or damage to equipment, as well as any number of potentially harmful failures.

In the interest of assuring robust communications, I/O communication networks used in process control systems have historically been hardwired. But unfortunately, hardwired networks introduce a number of complexities, challenges and limitations. For example, the quality of hardwired networks may degrade over time. Moreover, hardwired I/O communication networks are typically expensive to install, particularly in cases where the I/O communication network is associated with a large industrial plant or facility distributed over a large area, for example, an oil refinery or chemical plant consuming several acres of land. The requisite long wiring runs typically involve substantial amounts of labor, material and expense, and may introduce signal degradation arising from wiring impedances and electromagnetic interference. For these and other reasons, hardwired I/O communication networks are generally difficult to reconfigure, modify or update.

It has been suggested to use wireless I/O communication networks to alleviate some of the difficulties associated with hardwired I/O networks. For example, U.S. Patent Publication No. 2003/0043052, entitled "Apparatus for Providing Redundant Wireless Access to Field Devices in a Distributed Control System," the entire disclosure of which is hereby incorporated by reference, discloses a system utilizing wireless communications between controllers and field devices to augment or supplement the use of hardwired communications.

Unfortunately, power consumption may be a complicating factor for wireless communications in process control. Disconnected from the I/O network, the field devices may need to provide their own power source. Accordingly, field devices may be battery powered, draw solar power, or pilfer ambient energy such as vibration, heat, pressure, etc. For these devices, energy consumed for data transmission may constitute a significant portion of total energy consumption. In fact, more power may be consumed during the effort to establish and maintain a wireless connection than during other important operations performed by the field device, such as the steps taken to sense or detect the process variable being measured.

More generally, reliance on wireless communications for control-related transmissions has been limited due to, among other things, reliability concerns. As described above, modern process control relies on reliable data communication between the controller and the field devices to achieve optimum control levels. Moreover, typical controllers execute control algorithms at fast rates to quickly correct unwanted deviations in the process. Undesirable environmental factors or other adverse conditions may create intermittent interferences that impede or prevent the fast communications necessary to support such execution of control algorithms.

SUMMARY OF THE DISCLOSURE

In accordance with one aspect of the disclosure, a method is useful for controlling a process with a control signal. The method includes the step of implementing iterations of a control routine to generate the control signal. When an indication of a response to the control signal is unavailable, the method includes the steps of maintaining a feedback contribution to the control signal over one or more of the iterations of the control routine, and modifying the feedback contribution upon receiving the response indication. The modifying step includes the step of determining the feedback contribution in accordance with an elapsed time between the received response indication and a previous communication of the response indication.

In some cases, the feedback contribution is a reset contribution. Alternatively or additionally, the feedback contribution is a derivative contribution.

The modifying step may further include or involve determining the elapsed time based on a difference between times of receipt for the received response indication and the previous communication of the response indication. Alternatively or additionally, the modifying step may include or involve determining the elapsed time based on time stamps associated with the received response indication and the previous communication of the response indication.

In some embodiments, the response indication is a measurement of a process parameter controlled by the control routine. The process parameter may then be a process variable controlled by a field device responsive to the control signal.

The control routine may be a proportional-integral-derivative (PID) control routine for controlling a process variable in accordance with a set point. The feedback contribution is then generated by one of the integral and derivative components of the PID control routine, and the response indication is a measurement of either the process variable or a process parameter responsive to the control signal to control the process variable. Alternatively, the control routine implements a model predictive control (MPC) scheme such that the feedback contribution is based on a process model response.

The method may also include the step of monitoring a new value flag to determine when the indication of the response to the control signal is unavailable. The maintaining step may then include or involve calculating a reset contribution based on the new value flag, which, in turn, may include or involve utilizing feedback from a downstream element to determine the reset contribution. The calculating step may also include or involve maintaining the reset contribution if a changed value of the feedback from the downstream element is not received when expected.

In some cases, the method may further include the step of receiving the response indication via a wireless transmission. The method may alternatively or additionally further include the step of transmitting the response indication to facilitate the modifying step once the response indication is available.

The iterations of the control routine may be event-triggered. Alternatively or additionally, the iterations may be periodic In accordance with another aspect of the disclosure, a device for controlling a process with a control signal includes a processor, a communication interface to receive an indication of a response to the control signal, and a computer-readable medium in which a control routine is stored for execution by the processor to generate the control signal. The control module is configured to determine a contribution to the control signal based on the response indication, maintain the control signal contribution over one or more iterations of the control routine when the response indication is not received by the communication interface, and update the control signal contribution based on an elapsed time between updates of the response indication.

In some cases, the communications interface is configured to receive the response indication via a wireless transmission.

In some embodiments, the control routine is further configured to determine a reset contribution based on the new value flag and feedback from a downstream element.

BRIEF DESCRIPTION OF THE DRAWINGS

For a more complete understanding of the disclosure, reference should be made to the following detailed description and accompanying drawing figures, in which like reference numerals identify like elements in the figures, and in which.

Figure 1:
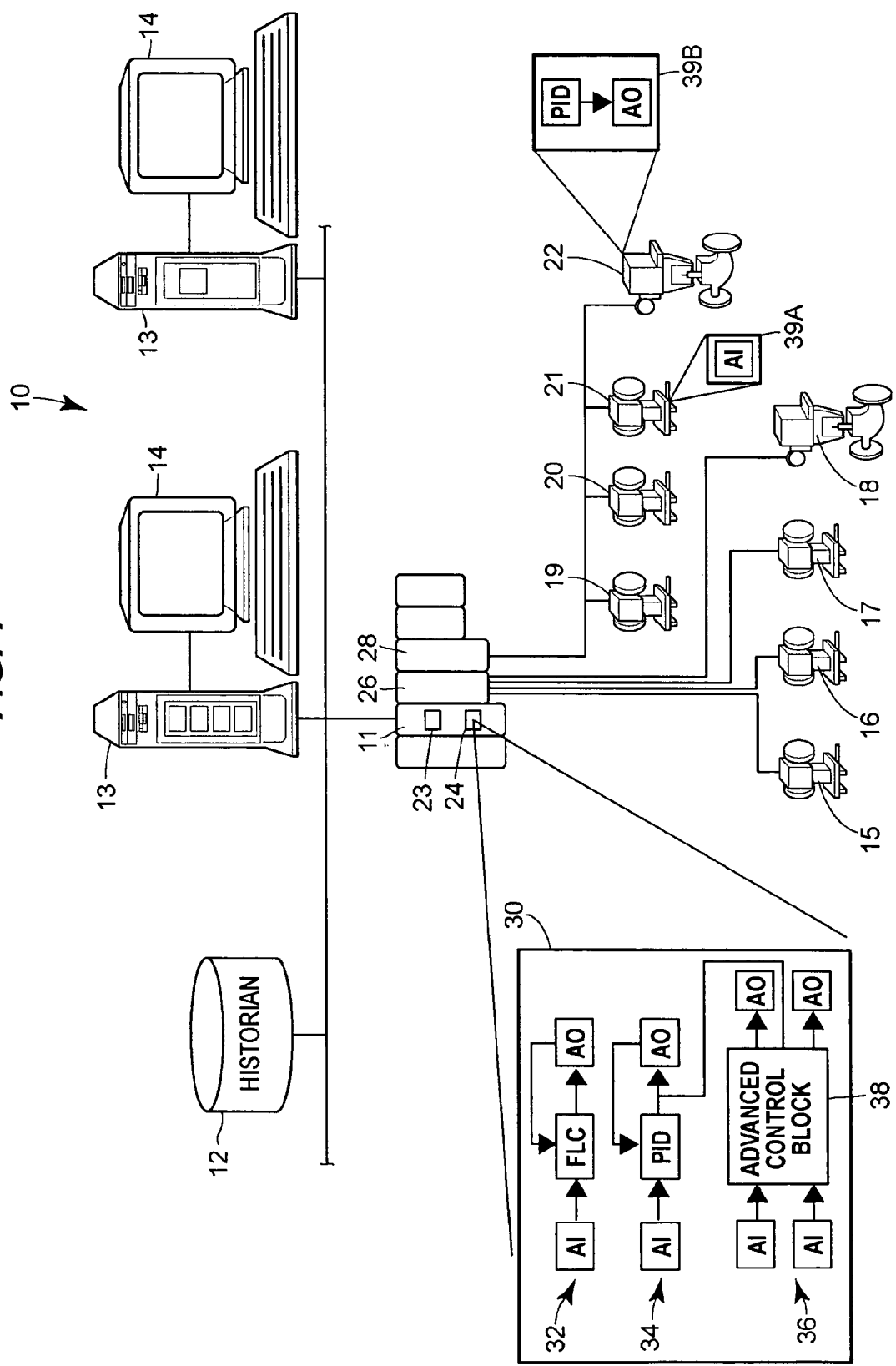
FIG. 1 is a schematic representation of a process control system having a controller (or control element) configured to implement one or more control routines utilizing non-periodic or less frequent control communications transmitted via hardwired connections between the controller and a number of field devices in accordance with one aspect of the disclosure.

While the disclosed system and method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DESCRIPTION OF PREFERRED EMBODIMENTS

Disclosed herein are process control systems, devices and methods that implement communication and control techniques to support the transfer of process control data between a controller and field devices, or between field devices, such as transmitters and other instrumentation. In another aspect of the disclosure, the disclosed techniques enable the process measurements and other information gathered by the field devices to be used by the controller (or other control element(s)) in the implementation of one or more process control routines.

In the past, such measurements were obtained and transmitted to the controller on a regularly timed, or periodic, basis to ensure that updated data was available for each iteration of the periodic execution of the process control routines. In contrast, the disclosed techniques allow the transmission of such data to be non-periodic and/or at intervals longer than the control execution period. As a result, the disclosed techniques may be well-suited for supporting process control measurements that may be provided intermittently, unreliably, or otherwise less frequently or non-regularly. Non-regular or less frequent transmissions may be advantageous for a number of reasons, and may result from any number of factors, conditions or aspects of the process control system or its environment.

In accordance with some embodiments, the disclosed techniques are utilized in connection with communication schemes, such as wireless communications, involving process control data transmissions made on a report-by-exception basis. Exception reporting of the process control data in a wireless communication context may present a number of advantages. For example, the rate at which power is consumed in the field by the transmitters or other field devices may be lowered, thereby conserving battery power or other limited power supplies.

Unlike past exception reporting, however, the disclosed techniques support the transmission of data utilized in a process control routine executed on a periodic basis. And despite the admonitions of the past discouraging the execution of process control routines utilizing data provided on an event-triggered basis, practice of the disclosed techniques accommodates the periodic execution of process control routines without detrimental sacrifices in performance.

Although well suited for, and described at times herein in connection with, wireless communication schemes, practice of the disclosed techniques is not limited to any particular communication scheme, context, or protocol, or any process control network, architecture, controller or system. Instead, the disclosed techniques may be applied in any number or variety of contexts in which process control data is transmitted less frequently than the control routine execution period, and for any desired reason. Such contexts may present undesirable or adverse conditions making communications unreliable or intermittent. Accordingly, the following description is set forth with the understanding that practice of the disclosed techniques is not limited to the low-power or other wireless communication schemes described below.

Referring now to FIG. 1, a process control system 10 includes a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV controller sold by Fisher-Rosemount Systems, Inc., is communicatively connected to the host computers 13 and to the data historian 12 via, for example, an ethernet connection or any other desired communication network. The controller 11 is also communicatively connected to the field devices 15-22 using either a hardwired communication scheme, as described further herein. In either case, any desired hardware, software and firmware may be utilized to implement the schemes, which may associated with, for example, standard 4-20 ma devices (when hardwired) and/or any smart communication protocol such as the FOUNDATION Fieldbus protocol, the HART protocol, etc. In the exemplary embodiment shown in FIG. 1, however, communications between the controller 11 and the field devices 15-22 involve hardwired connections.

More generally, the field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices that communicate over analog lines to the I/O card 26, while the field devices 19-22 are smart devices, such as Fieldbus field devices, that communicate over a digital bus to the I/O card 28 using Fieldbus protocol communications. Of course, the field devices 15-22 may conform to any other desired standard(s) or protocols, including any standards or protocols developed in the future.

The controller 11 includes a processor 23 that implements or oversees one or more process control routines (or any module, block, or sub-routine thereof) stored in a memory 24. The process control routines stored in the memory 24 may include or be associated with control loops stored therein. Generally speaking, the controller 11 communicates with the devices 15-22, the host computers 13 and the data historian 12 to control a process in any desired manner. It should be noted that any control routines or modules described herein may have parts thereof implemented or executed in a distributed fashion across multiple devices. As a result, a control routine or module may have portions implemented by different controllers, field devices (e.g., smart field devices) or other devices or control elements, if so desired. Likewise, the control routines or modules described herein to be implemented within the process control system 10 may take any form, including software, firmware, hardware, etc. Any device or element involved in providing such functionality may be generally referred to herein as a "control element," regardless of whether the software, firmware, or hardware associated therewith is disposed in a controller, field device, or any other device (or collection of devices) within the process control system. For the purpose of this disclosure, a control module may be any part or portion of a process control system including, for example, a routine, a block or any element thereof, stored on any computer readable medium. Such control modules, control routines or any portions thereof (e.g., a block) may be implemented or executed by any element or device of the process control system, referred to herein generally as a control element. Control routines, which may be modules or any part of a control procedure such as a subroutine, parts of a subroutine (such as lines of code), etc., may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Still further, the control routines may be designed using any design tools, including graphical design tools or any other type of software/hardware/firmware programming or design tools. Thus, the controller 11 may be configured to implement a control strategy or control routine in any desired manner.

In some embodiments, the controller 11 implements a control strategy or scheme using what are commonly referred to as function blocks, where each function block is an object or other part (e.g., a subroutine) of an overall control routine that operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist and may be utilized herein. The function blocks may be stored in and executed by the controller 11, which is typically the case when the function blocks are used for, or are associated with standard 4-20 ma devices and some types of smart field devices such as HART devices. Alternatively or additionally, the function blocks may be stored in and implemented by the field devices themselves, or other control elements of the process control system, which may be the case with systems utilizing Fieldbus devices. While the description of the control system 10 is provided herein using a function block control strategy, the disclosed techniques and system may also be implemented or designed using other conventions, such as ladder logic, sequential function charts, etc. or using any other desired programming language or paradigm.

As illustrated by the exploded block 30 of FIG. 1, the controller 11 may include a number of single-loop control routines, illustrated as routines 32 and 34, and, if desired, may implement one or more advanced control loops, illustrated as control loop 36. Each such loop is typically referred to as a control module. The single-loop control routines 32 and 34 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 36 is illustrated as including an advanced control block 38 having inputs communicatively connected to one or more AI function blocks and outputs communicatively connected to one or more AO function blocks, although the inputs and outputs of the advanced control block 38 may be connected to any other desired function blocks or control elements to receive other types of inputs and to provide other types of control outputs. The advanced control block 38 may implement any type of multiple-input, multiple-output control scheme, and may constitute or include a model predictive control (MPC) block, a neural network modeling or control block, a multi-variable fuzzy logic control block, a real-time-optimizer block, etc. It will be understood that the function blocks illustrated in FIG. 1, including the advanced control block 38, can be executed by the controller 11 or, alternatively, can be located in and executed by any other processing device or control element of the process control system, such as one of the workstations 13 or one of the field devices 19-22. As an example, the field devices 21 and 22, which may be a transmitter and a valve, respectively, may correspond with control elements for implementing a control routine and, as such, include processing and other components for implementing parts of the control routine, such as one or more function blocks. More specifically, the field device 21 may have a memory 39A for storing logic and data associated with an analog input block, while the field device 22 may include an actuator having a memory 39B for storing logic and data associated with a PID or other control block in communication with an analog output (AO) block, as shown.

Figure 2:
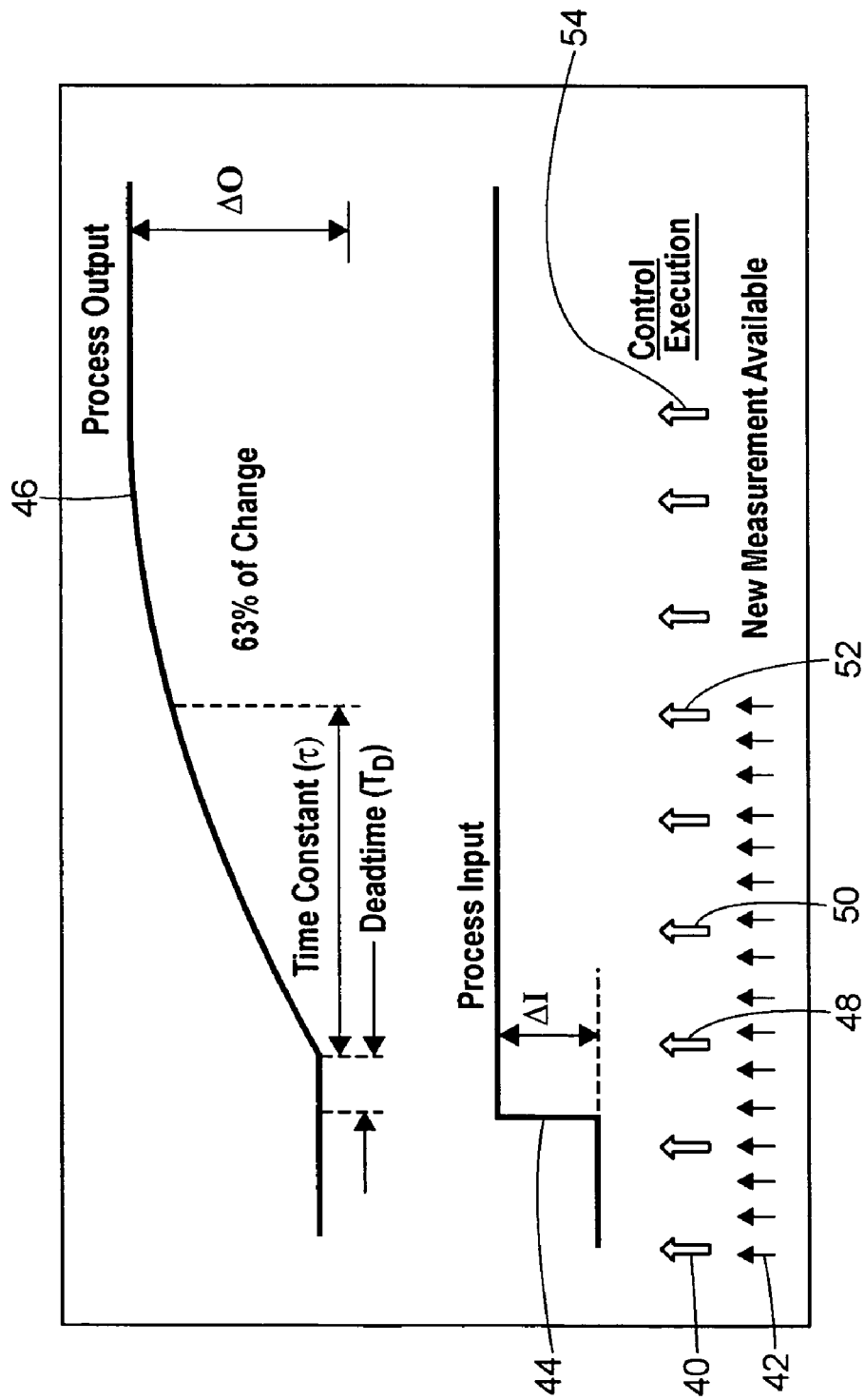
FIG. 2 is a graphical representation of the implementation of a control routine by the controller (or control element) of FIG. 1 via a plot depicting a process response to a process input, i.e., the control signal, and exemplary instances of measurement transmissions and control execution iterations.

With reference now to FIG. 2, the implementation of each of the control loops 32, 34 and 36 (and any control loop incorporating the processing of the function blocks residing in the field devices 21 and 22) is generally adapted for periodic execution via multiple iterations 40 of the control routine. In a conventional case, each iteration 40 is supported by an updated process measurement 42 provided by, for instance, a transmitter or other field device. To avoid the restrictions of synchronizing the measurement value with the control, many past controllers (or control loops) were designed to over-sample the measurement by a factor of 2-10 times. Such over-sampling helped ensure that the process measurement was current for use in the control scheme. Also, to minimize control variation, conventional designs specified that feedback control should be executed 4-10 times faster than the process response time, which is depicted in FIG. 2 as a process time constant plus a process delay after a step change 44 in the process input, i.e., the control signal. More generally, the process response is indicated by a change in a process output or variable 46 over time. Thus, to satisfy these conventional design requirements, the measurement value has often been sampled much faster that the process responds, as illustrated in FIG. 2.

Generally speaking, the disclosed techniques address the challenge of transmitting the measurement values at such high rates. For example, and as described above, the sensing functionality associated with the measurement may not consume much of the power supply for the sensor or transmitter, but the transmission of the measurement value via a wireless communication link may, over time, constitute a significant power supply drain. Even if measurement and control execution are synchronized, as in Foundation Fieldbus control schemes, the conventional approach to scheduling control 4-10 times faster than the process response may still result in too much power consumption during data transmission. Thus, to reduce transmitter power consumption, the disclosed techniques generally support minimizing how often a measurement value is communicated.

To that end, and in accordance with one aspect of the disclosure, the disclosed techniques generally configure the process control system 10, and the controller 11 and transmitting and other field devices thereof, to transmit a new measurement value on a non-periodic basis when certain conditions are satisfied. In one embodiment, a new measurement value is transmitted based on whether the process variable has changed by more than a predetermined threshold (e.g., an amount determined to be significant). More specifically, if the magnitude of the difference between the new measurement value and the last communicated measurement value is greater that a specified resolution, then a trigger may be generated such that the measurement will be updated.

In other cases, a new measurement value is transmitted when the difference exceeds the specified resolution (as in the prior case), as well as when the time since the last communication exceeds a predetermined refresh time. In other words, either a change in the process variable (e.g., the process response between control execution iterations 48 and 50), or the passing of a default time (e.g., the time elapsed between iterations 52 and 54), may result in a measurement transmission. The refresh, or default, time for measurement transmission may vary between control loops, inasmuch more or less frequent updates may be suitable depending on whether the process is slow moving or rapid in response (as indicated, for instance, by the process time constant). In some cases, a determination may be made during the tuning of the control loop based on the time constant, and adjusted thereafter as desired. In any case, the default or refresh time acts as an integrity check, or override, after periods of time without a measurement update. Such checks may be useful to, for instance, facilitate the final drive of the process variable to target.

In the meantime, the transmitter, sensor or other field device responsible for obtaining the measurement values may still be periodically sampling the measurement at any desired rate, such as the conventional 4-10 times the process response time. The disclosed techniques then determine whether the sampled values are transmitted to the controller 11.

Although the operational context set forth in connection with FIG. 2 and the exemplary embodiments described below involve control routines that are periodically executed, the disclosed techniques are not limited to such contexts or applications. In some embodiments, the control routines (e.g., PI, PID, etc.) may be event-triggered in a way that the routines are executed in a non-periodic fashion. In such cases, the output of the control routine (i.e., the control signal) will remain the same as long as the set point and other parameters or configuration of the control block (or routine) are not modified. This may be adequate in certain applications. However, by defining the trigger event broadly to include any set point change, any change in a gain parameter, or any other change in the control block (i.e., control routine configuration), then such event-triggered execution will provide the same results as periodically executed control routines. For these reasons, the disclosed techniques may be utilized in conjunction with both event-triggered and periodic control routines. This description is also set forth with the understanding that periodic execution may also be considered a form of event-triggered execution, inasmuch as the trigger event may correspond with the ending (or beginning) of each execution time period.

Figure 3:
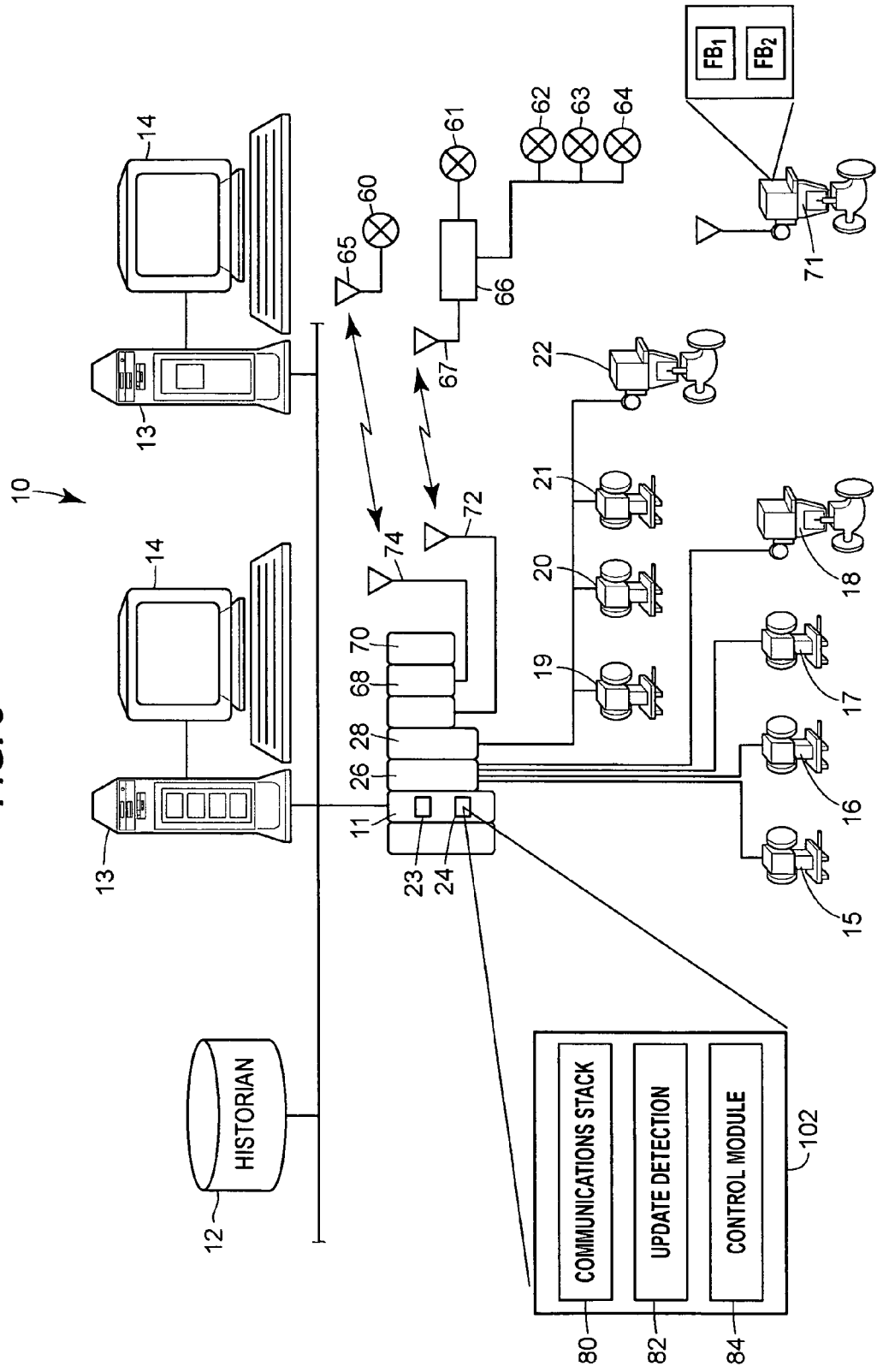
FIG. 3 is a schematic representation of a process control system having a controller (or control element) configured to implement one or more control routines utilizing non-periodic or less frequent control communications transmitted via wireless connections between the controller and a number of field devices, or between field devices, in accordance with one aspect of the disclosure.

FIG. 3 depicts an exemplary case in which the disclosed techniques may be applied to reduce power consumption during wireless communication of process control data to support the operation of the controller 11 and, more generally, the process control system 10 of FIG. 1. At the outset, however, it should be noted that the hardwired connections shown in FIGS. 1 and 3 may also utilize and benefit from application of the disclosed techniques. For example, one or more of the hardwired devices may also rely on a limited power supply or otherwise benefit from reduced data transmission. In one exemplary case, the system 10 may include a sampled analyzer or other sampling system designed to provide measurement data at rates slower than the control execution rate.

It should further be noted that, for ease in illustration, a number of wireless field devices have been added to the process control system 10, with the field devices 15-22 remaining hardwired to the controller 11 via the I/O devices 26 and 28. In alternative embodiments, one or more of the field devices 15-22 may also or alternatively communicate with the controller 11 wirelessly in accordance with the disclosed techniques.

In the exemplary case shown in FIG. 3, however, the disclosed techniques generally involve the wireless transmission of data measured or sensed by transmitters 60-64 or other control elements, as described below. The wireless communications may be established using any desired equipment, including hardware, software, firmware, or combination thereof now known or later developed. The exemplary equipment of this embodiment is represented by an antenna 65 coupled and dedicated to the transmitter 60 and a wireless router or other module 66 having an antenna 67 to collectively handle communications for the transmitters 61-64. In some cases, the transmitters 60-64 may constitute the sole link between the process sensors and the control room and, as such, be relied upon to send accurate signals to the control network to ensure that product quality and flow are not compromised. Thus, the transmitters 60-64, often referred to as process variable transmitters (PVTs), may play a significant role in the process control system 10.

On the receiving end of the wireless communication links, the controller 11 may have one or more I/O devices 68 and 70 with respective antennas 72 and 74. More generally, practice of the disclosed techniques is not limited to any configuration of transmitters or wireless equipment. For instance, wireless transmissions in addition to those with the controller 11 may be involved in implementing the disclosed control techniques. In the exemplary case shown in FIG. 3, a wireless field device 71 may be a smart valve and, thus, provide a control element for implementing part(s) of a control routine. As a result, function blocks FB1 and FB2 of the field device 71 may communicate directly with function blocks resident in other field devices, such as one or more of the transmitters 61-64, during the implementation of the control routine.

Each of the transmitters 60-64 may transmit a process signal indicative of a respective process variable (e.g., a flow, pressure, temperature or level) to the controller 11 for use in one or more control loops or routines. Other wireless devices, such as the field device 71, may also receive the process signals wirelessly, and/or be configured to transmit other signals indicative any other process parameter. Generally speaking, the controller 11 and other wireless devices, such as the field device 71, may include a number of elements directed to supporting such wireless communication and, specifically, reception, of the process signals. The elements may include or constitute, for example, software routines stored in the memory 24 or hardware or firmware resident elsewhere in the controller 11. In any case, the manner in which the wireless communications are received (e.g., demodulated, decoded, etc.) may take any desired form, and will only be generally addressed herein. In one example, the controller 11 may include a communications stack 80 to process the incoming signals, and a module or routine 82 to detect when an incoming signal has provided a measurement update. The detection routine 82 may then generate a flag or other signal to denote that data being provided via the communications stack 80 includes a new measurement value or measurement update. The new data and the update flag may then be provided to one or more control modules 84 (or function blocks) to be implemented as discussed above in connection with the routines generally shown in FIG. 1 and described in further detail below. The update detection functionality may be implemented at the function block level as well, and may be provided by one or more function blocks associated with the control module 84. Other wireless devices, such as the field device 71, may include similar components and functionality to support the reception and processing of such signals by, for instance, one or more of the function blocks (e.g., FB1 and FB2) resident therein.

In some cases, the communications stack 80 and the update detection module 82 are implemented by one or more of the I/O devices 26, 28, 68 and 70 (FIGS. 1 and 3). Furthermore, the manner in which the update detection module 82 makes its determination may involve hardware, software, firmware or any combination thereof, and may involve any suitable routine for comparing values of the process variable.

The communication techniques described above for the wireless (or other) transmitters generally result in non-periodic, irregular or otherwise less frequent data transmissions. However, the communication of measurement values from the field to the controller 11 has traditionally been structured to report in a periodic manner to, in turn, support the periodic execution of the control routine(s). In other words, the control routines are generally designed for, and rely on, periodic updates of the measurement values.

To accommodate the non-periodic or otherwise unavailable measurement updates (and other unavailable communication transmissions), further aspects of the disclosure are generally directed to modifying or re-structuring the control routine(s). In this manner, the process control system 10 may rely on non-periodic or other intermittent updates that occur less frequently than the control execution period. In this way, the disclosed techniques may, in some cases, generally support a form of exception reporting for the process variable measurements despite the periodic execution of the process control routines. As described below, the disclosed techniques may also address and support a form of exception reporting involving transmissions between the control routine and the devices downstream of the control routine, e.g., the actuators and other devices or elements responsive to the control signal generated by the control routine.

The underlying assumption in the control design (e.g., using z transform, difference equations, etc.) and digital implementation of the control routines, such as proportional-integral-derivative (PID) control, is that the algorithm is executed on a periodic basis. If the measurement is not updated, then steps such as the integral (or reset) portion or contribution of the routine may not be appropriate. For example, if the control algorithm continues to execute using the last, outdated measurement value, then the output will continue to move based on the reset tuning and error between the last measured value and the setpoint. On the other hand, if the control routine is only executed when a new measurement is communicated, then the control response to setpoint changes and feedforward action on measured disturbances could be delayed. Control routines may also include calculations based on the time elapsed since the last iteration. But with non-periodic and/or less frequent measurement transmissions, calculating the reset contribution based on the control execution period (i.e., the time since the last iteration) may result in increased process variability.

In view of the foregoing challenges, and to provide accurate and responsive control when measurement values are not updated on a periodic basis, disclosed herein are control techniques that generally modify the process control routine based on whether an update of the process variable is available. In some cases, the control routine may be restructured in accordance with the disclosed techniques based on the expected process response since the last measurement update.

Figure 4:
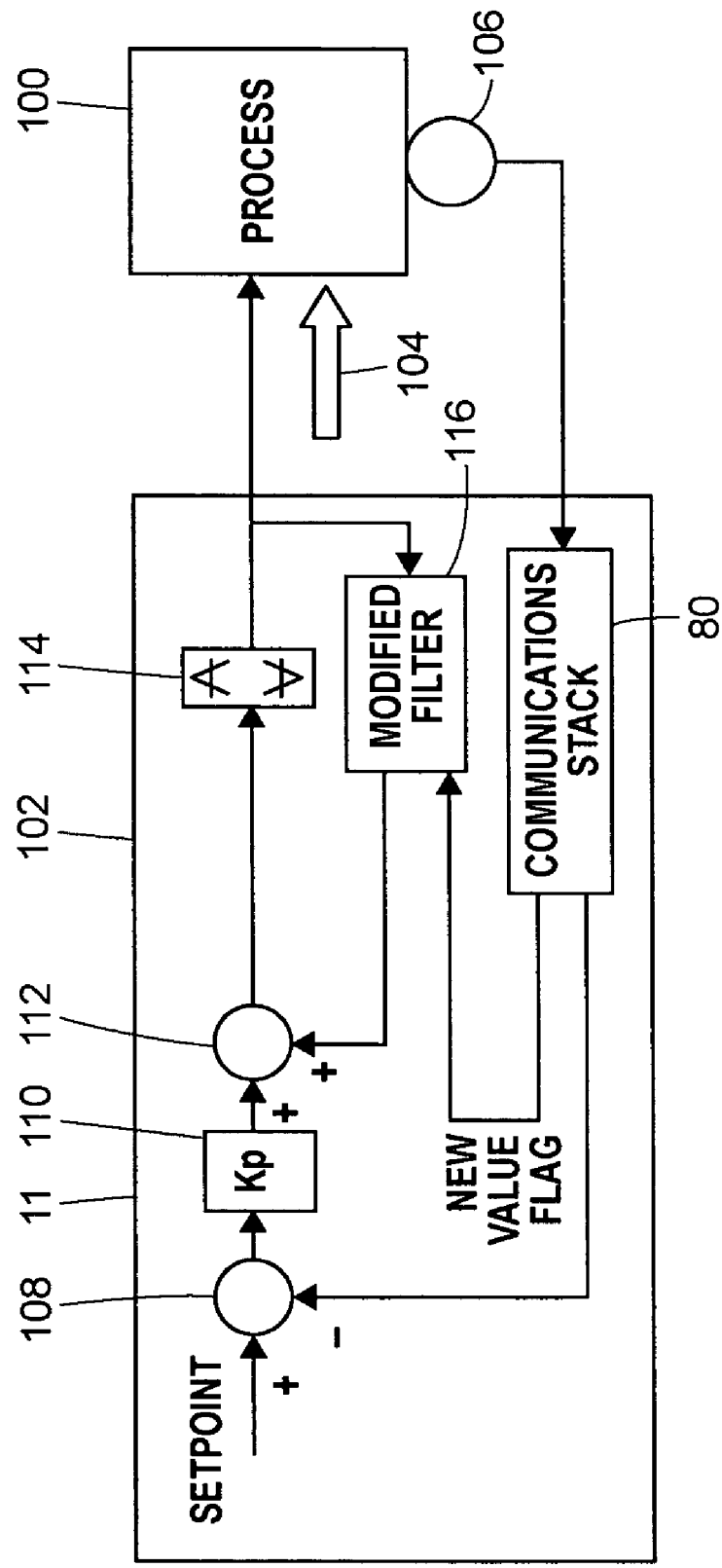
FIG. 4 is a schematic representation of the controller (or control element) of either FIG. 1 or FIG. 3 in accordance with one embodiment in which the controller generates a process input signal, or control signal, to control a process despite wireless, non-periodic or other transmission of process measurements less frequently than the control execution rate.

An exemplary embodiment of a control scheme configured in accordance with one aspect of the disclosed techniques is shown in FIG. 4, where the process is generally and schematically indicated at 100. The exemplary control scheme may correspond with a component 102 (or set of components, as desired) of the controller 11, or a control element of a field device (e.g., the wireless field device 71), configured to provide the functionality of the communications stack 80, the update detection module 82 and the control module 84 also shown and described in connection with FIG. 3. In this exemplary case, the controller 11 receives a setpoint from, for example, one of the workstations 13 (FIG. 1) or from any other source within or in communication with the process control system 10 to generate one or more process input or other control signals to control the process 100, which may be subjected to measured or unmeasured disturbances schematically shown at 104. As described above, the process input signal(s) may control an actuator associated with a valve or any other field device to effect a response in the operation of the process. The process response to changes in the process input signal are measured or sensed by a transmitter, sensor or other field device 106, which may, for example, correspond, for example, with any one of the transmitters 60-64 shown in FIG. 3. As a result, the communication link (depicted via dashed lines) between the transmitter 106 and the controller II may include a wireless connection. Alternatively, or in addition, the communications may include a hardwired connection, as desired, which may benefit from the disclosed techniques because, for example, it is intermittently available or operational.

In this exemplary case, the controller 11 implements a single closed-loop control routine, such as a PI control routine. Accordingly, the control loop includes several standard PI control scheme elements, including a summing point 108 for comparing the setpoint with the process variable data, a proportional gain element 110, another summing point 112 for combining, for instance, the proportional and integral contributions, and a high-low limiter 114. In addition to the standard elements of the control scheme, this embodiment of the disclosed control technique utilizes a modified filter 116 to provide an indication of the expected process response to the control signal. In this exemplary case, the expected process response is approximated as first order and is realized by the modified filter included in the positive feedback loop that determines the integral contribution of the PI control scheme. More generally, the expected process response utilized in the control implementation may be provided by any model of the process, and is not limited to incorporation in a positive feedback loop, a filter or an integral or reset contribution. For example, the control utilizing a model to provide the expected process response may incorporate a derivative contribution such that the control routine implements a PID control scheme. Several exemplary embodiments incorporating an exemplary type of derivative contribution are described below in connection with FIGS. 6-8.

The modified filter 116 differs from a traditional reset or integral contribution in a number of ways. By way of background, a traditional PI controller may be implemented using a positive feedback network to determine the reset contribution. Mathematically, it can be shown that the transfer function for the traditional implementation is equivalent to the standard formulation for unconstrained control i.e. output not limited.

$$\frac{O(s)}{E(s)} = K_P\left(1 + \frac{1}{sT_{Reset}}\right)$$

where
$K_P$=Proportional Gain
$T_{Reset}$=Reset, seconds
$O(s)$=Control Output
$E(s)$=Control Error One advantage of the positive feedback network is that the reset contribution is automatically prevented from winding up when the controller output is high or low limited, i.e., by the limiter 114.

A variety of other control schemes may be utilized in connection with the disclosed techniques. For instance, as shown in FIG. 1, a model predictive control (MPC) scheme may replace the PI control scheme described above. Furthermore, the control scheme need not be implemented within the controller 11, but may be implemented in the control element(s) residing in one or more field devices.

In accordance with one aspect of the disclosure, the control technique implemented by the disclosed system and method involves using a non-periodic measurement update of the process variable. The positive feedback network of the reset contribution (or other filter or routine) is modified to accommodate such updates. Specifically, the filter 116 (or other routine) is configured such that the last calculated filter output is maintained until a new measurement is communicated (e.g., received). When a new measurement is received, the filter 116 calculates the new filter output based on the last controller output (i.e., the control signal) and the elapsed time since a new measurement value was communicated. An exemplary case of this control technique is set forth below:

$$F_N = F_{N-1} + (O_{N-1} - F_{N-1}) * \left(1 - e^{\frac{-\Delta T}{T_{Reset}}}\right)$$

where
$F_N$=New filter output
$F_{N-1}$=Filter output last execution=filter output after last new measurement
$O_{N-1}$=Controller output last execution
$\Delta T$=Elapsed time since a new value was communicated In this way, the control routine accounts for the expected process response to the last measurement transmission when calculating the control input based on the new measurement. And as a result, the transmitter may implement any communication techniques in which an update is not provided for every iteration of the control execution, such as the techniques described above. For those communication techniques involving wireless transmissions, this allows wireless transmitters and other devices to minimize the amount of power consumed as a result of data transfer for process control.

It should be noted that the reset contribution of a closed-loop control routine such as that described above may provide an accurate representation of the process response in a number of ways, such as if the process exhibits steady-state behavior. Other processes, such as deadtime dominant processes, may involve the incorporation of additional components in the routine modeling the expected process response, as discussed below. But with regard to processes well represented by a first-order model, the process time constant may be used to determine the reset time for the PI (or PID) controller. More specifically, if one sets the reset time equal to the process time constant, the reset contribution generally cancels out the proportional contribution such that, over time, the routine reflects the expected process response. This approach is reflected in the exemplary embodiment of FIG. 4 in which the reset contribution is effected by a positive feedback network having a filter with the same time constant as the process time constant. While other models may be utilized, the positive feedback network, filter, or model provides a convenient mechanism for determining the expected response of a process having a known or approximated process time constant.

As an example, the number of communications during the duration of a test involving the disclosed techniques was reduced by over 96%. The impact of non-periodic measurement updates on control performance was also minimized through the use of the above-described, modified PI algorithm. Specifically, the difference in control performance is shown below in Table 1 in a comparison of the Integral Absolute Error (IAE) for periodic measurement update vs. non-periodic updates.

TABLE 1

CONTROL PERFORMANCE DIFFERENCE

| Communications/Control | Number of Communications | IAE |
|---|---|---|
| Periodic Communications with Standard PI Controller | 692 | 123 |
| Disclosed Techniques (Non-periodic communication with modified PI control) | 25 | 159 |

For those processes that require PID control, the derivative contribution, also known as rate, to the PID output may also be recomputed and updated only when a new measurement is received. In those cases, the derivative calculation may similarly use the elapsed time since the last new measurement.

As shown in FIG. 4, the communications stack 80 and, in some embodiments, the update detection module 82 (FIG. 3), process the incoming data from the transmitter 106 to generate a new value flag for the modified filter 116. The new value flag is provided to the modified filter 116 to determine when the new filter output should be calculated.

Figure 5:
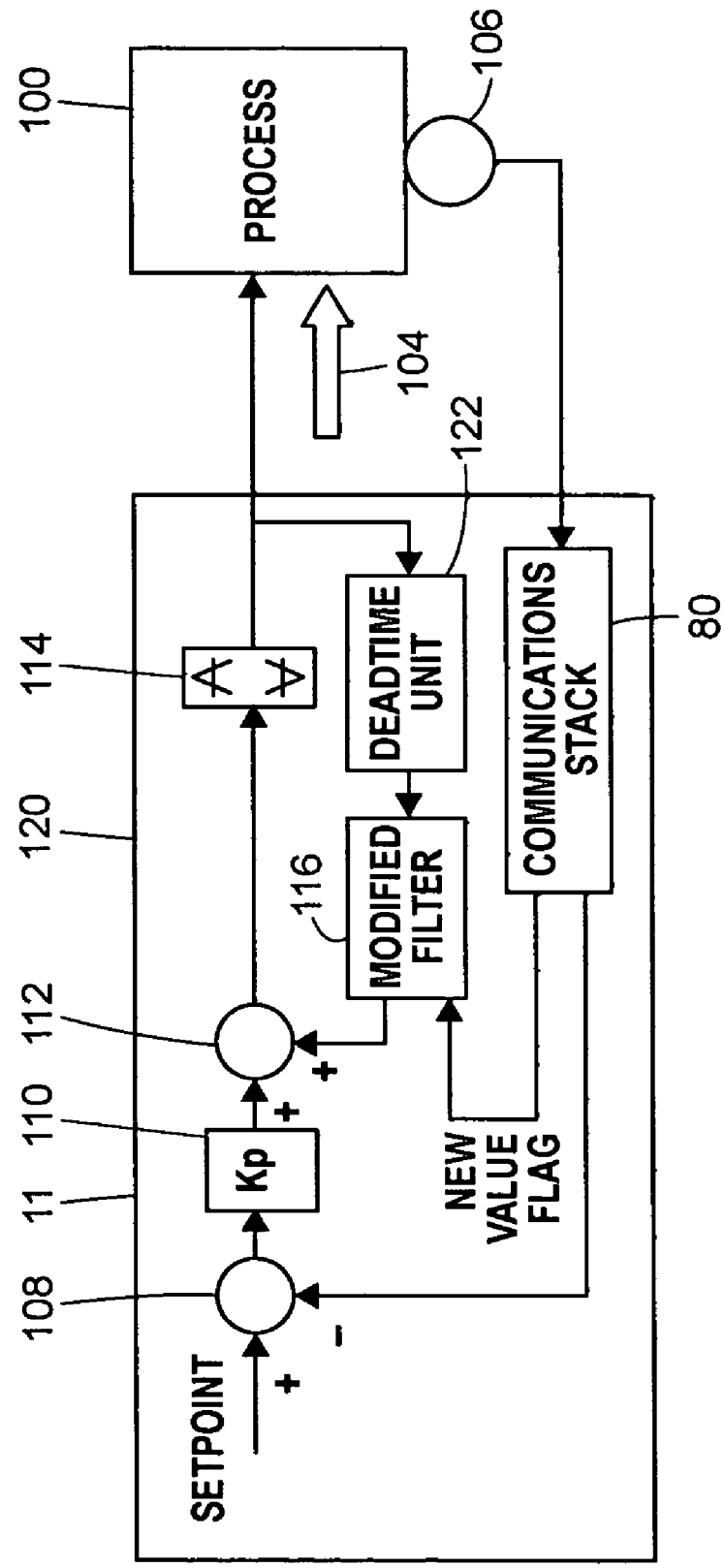
FIG. 5 is a schematic representation of a controller (or control element) in accordance with an alternative embodiment configured to control a process having process and/or measurement delay.

Referring now to FIG. 5, an alternative controller (or control element) 120 configured in accordance with the disclosed control techniques is similar in many respects to the controller 11 shown in FIG. 4. As a result, elements common to both controllers are identified with like reference numerals. The controller 120, however, incorporates an additional element into the routine that determines the expected process response between measurement transmissions. In this case, the process may be characterized as having a considerable amount of deadtime and, as a result, a unit or block 122 is included in the model for deadtime compensation. The incorporation of the deadtime unit 122 generally helps to arrive at a more accurate representation of the process response. More specifically, the deadtime unit 122 may be implemented in any desired fashion and may include or utilize methods common to Smith predictors or other known control routines.

Figure 6:
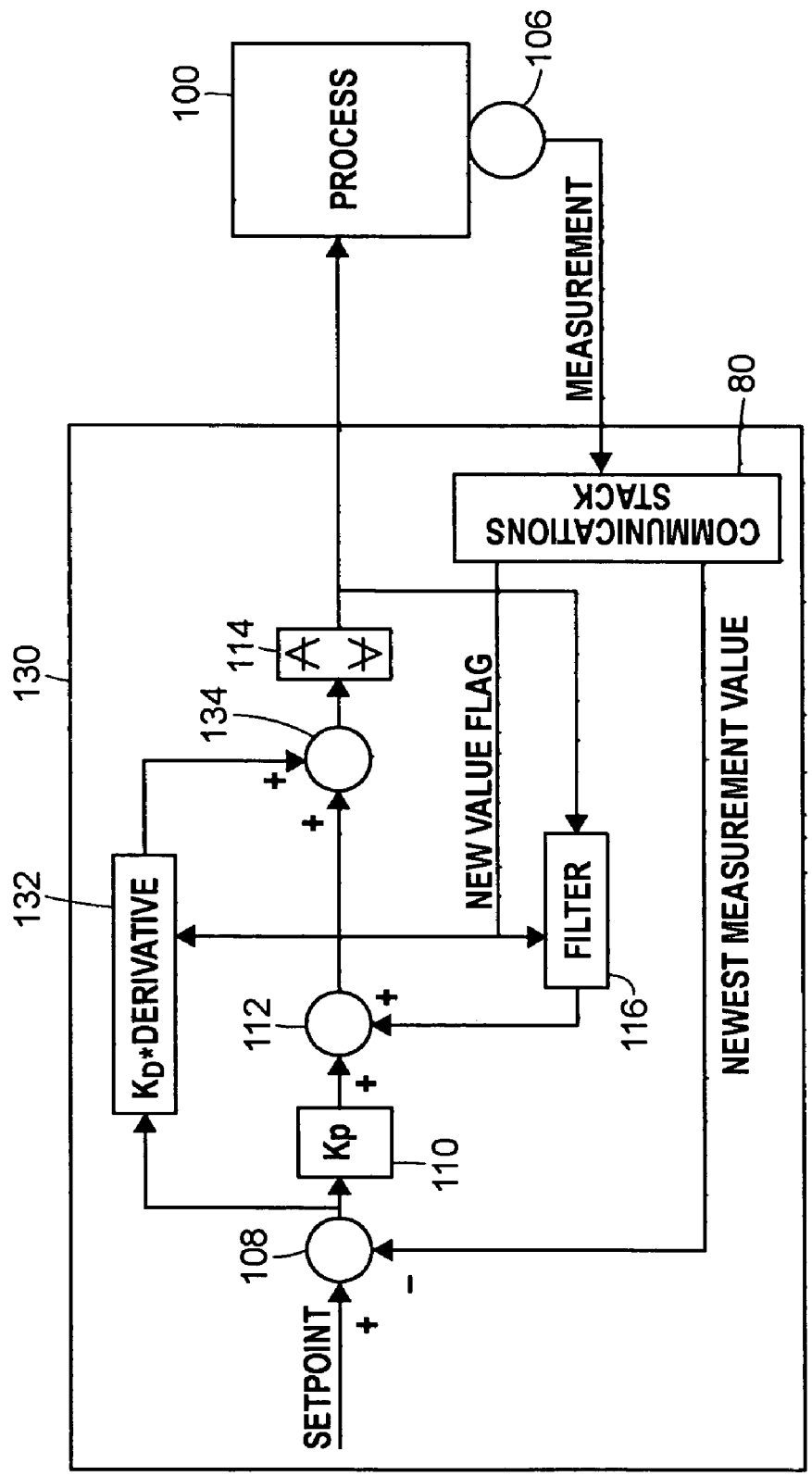
FIG. 6 is a schematic representation of the controller (or control element) of either FIG. 1 or FIG. 3 in accordance with another embodiment in which the controller generates a control signal via a control routine having a derivative, or rate, contribution.

FIG. 6 depicts another alternative controller (or control element) 130 that differs from the embodiments described above in that a derivative, or rate, contribution to the control signal is incorporated into the process control routine. The derivative contribution provides an additional feedback mechanism to the exemplary control scheme, such that, in some cases, a proportional-integral-derivative (PID) control scheme is implemented.

The derivative contribution is configured in a manner similar to that described above in connection with the integral contribution to accommodate non-periodic or otherwise unavailable updates of the process measurement. The derivative contribution may also be restructured to be based on the elapsed time since the last measurement update. In this way, a spike in the derivative contribution (and the resultant output signal) is avoided.

The derivative contribution is determined by a derivative element or component 132 that receives the error signal in parallel with the elements dedicated to the proportional and integral contributions. While other PID configurations may also be utilized (e.g., a serial configuration), the proportional, integral and derivative contributions are combined at a summing junction 134 as shown in FIG. 6.

To accommodate unreliable transmissions and, more generally, the unavailability of measurement updates, the derivative contribution is maintained at the last determined value until a measurement update is received. This allows the control routine to continue with periodic execution. Upon reception of the updated measurement, the derivative gain element 132 may determine the derivative contribution in accordance with the following equation:

$$O_D = K_D \cdot \frac{e_N - e_{N-1}}{\Delta T}$$

where
$e_N$=current error
$e_{N-1}$=last error
$\Delta T$=Elapsed time since a new value was communicated
$O_D$=controller derivative term With this technique for determining the derivative contribution, the measurement updates for the process variable (i.e., control input) can be lost for one or more execution periods without the production of output spikes. When the communication is reestablished, the term $(e_N-e_{N-1})$ in the equation may generate the same value as that generated in the standard calculation of the derivative contribution. However, for the standard PID technique, the divisor in the derivative determination would be the execution period. In contrast, the disclosed technique utilizes the elapsed time between two successfully received measurements. With an elapsed time greater than the execution period, the disclosed technique produces a smaller derivative contribution, and reduced spiking, than the standard PID technique.

To facilitate the determination of the elapsed time, the communications stack 80 may provide the new value flag described above to the derivative contribution element 132 as shown in FIG. 6. Alternative embodiments may include or involve detection of a new measurement, or update, based on its value. Also, the process measurement may be used in place of the error in the calculation of the proportional or derivative component. More generally, the communication stack 80 may include or incorporate any software, hardware or firmware (or any combination thereof) to implement a communications interface with the process, including any field devices within the process, process control elements external to the controller, etc.

An actuator or other downstream element controlled by the controllers described in connection with FIGS. 3-6 may still receive a control signal with sudden changes after periods of no communication from the controller or control element to the downstream actuator or other element. The control action may be sufficiently abrupt in some cases to impact plant operations. Such abrupt changes may also lead to unsuitable levels of instability.

The potential for abrupt control changes because of loss communications between the controller and the downstream element may be addressed by incorporating actual downstream data in place of the controller output last execution in the determination of the feedback contribution(s) to the control signal. Generally speaking, such actual downstream data provides a feedback indication of a response to the control signal, and thus may be measured or calculated by a downstream element (e.g., a process control module) or a device (e.g., an actuator) that receives the control signal. Such data is provided in lieu of an implied response to the control signal, such as the controller output from the last execution. As shown in FIGS. 4-6, the filter 116 received the control signal as an implied indication of the downstream response. The use of such implied data effectively assumes that the downstream element, such as an actuator, received the communications of the control signal and, thus, is responding appropriately to the control signal. The actual feedback data also differs from other response indications, such as the measurement of the process variable being controlled.

Figure 7:
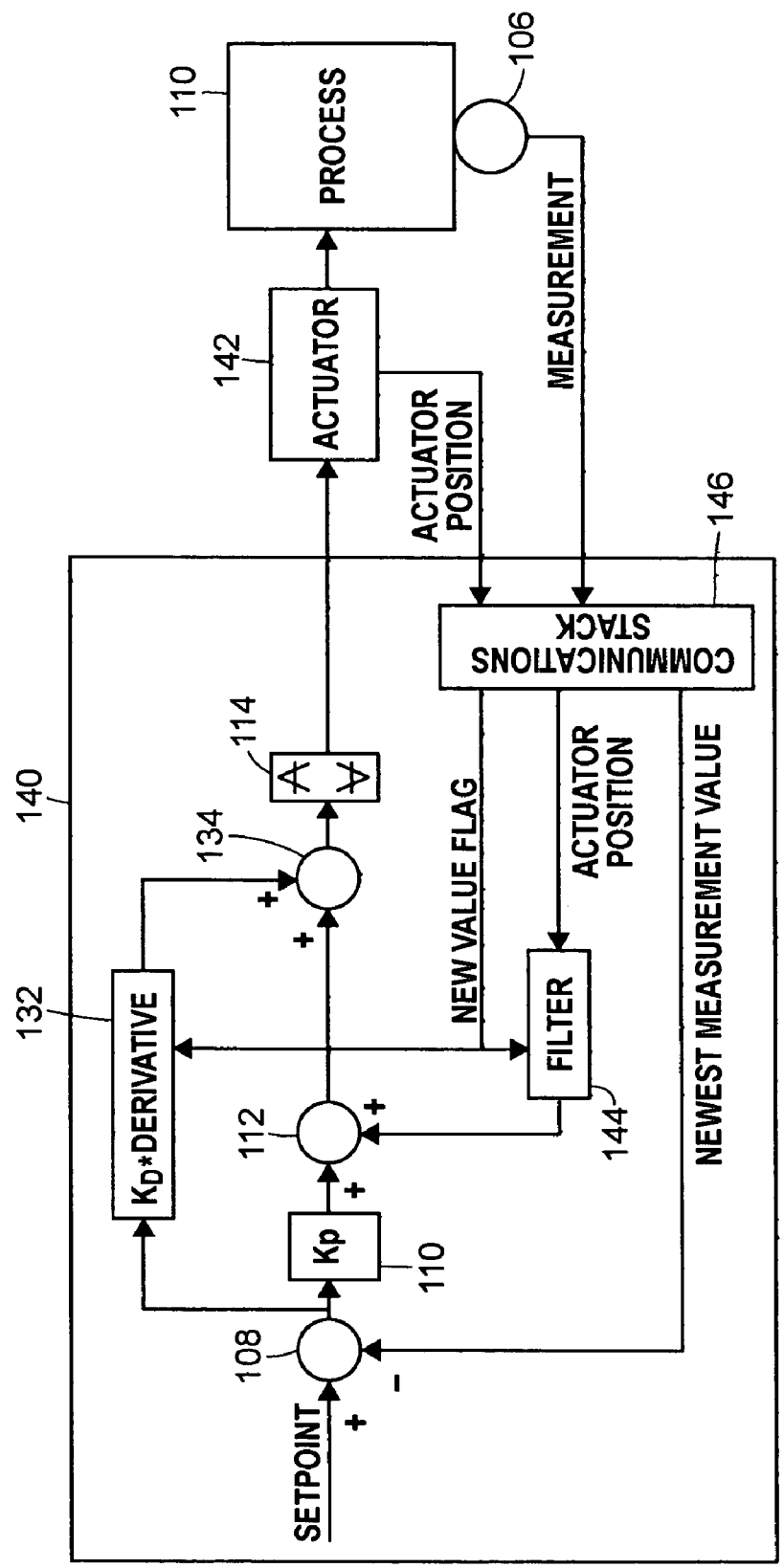
FIG. 7 is a schematic representation of the controller (or control element) of either FIG. 1 or FIG. 3 in accordance with yet another embodiment in which the controller generates a control signal determined from data provided by a field device, control element or other downstream device controlled by the control signal; and, FIG. 8 is a schematic representation of the controller (or control element) of either FIG. 1 or FIG. 3 in accordance with yet another embodiment in which the controller generates a control signal via a control routine capable of being configured to determine an integral, or reset, contribution from either actual or implied data for a field device or control element controlled by the control signal.

FIG. 7 depicts an exemplary embodiment in which a controller 140 receives actuator position data from a downstream device or element responsive to the control signal. The downstream device or element often corresponds with an actuator providing a measurement of actuator position. More generally, the downstream device or element may correspond with, or include, a PID control block, control selector, splitter or any other device or element controlled by the control signal. In the exemplary case shown, the actuator position data is provided as an indication of the response to the control signal. As such, the actuator position data is utilized by the controller 140 during periods of continued execution of the control routine despite the absence of measurement updates of the process variable. To this end, a filter 144 may receive the actuator position data via a communications stack 146 that establishes an interface for incoming feedback data. In this exemplary case, the feedback data includes two indications of responses to the control signal, the actuator position and the process variable.

As with the previous embodiments, the filter 144 is configured to accommodate situations involving the absence of measurement updates for the process variable. The filter 144 similarly maintains its output during such absences. But upon reception of a measurement update, the filter 144 no longer relies upon feedback of the control signal to modify its output. Rather, the actual response data from the actuator is utilized as shown below:

$$F_N = F_{N-1} + (A_{N-1} - F_{N-1}) * \left(1 - e^{\frac{-\Delta T}{T_{Reset}}}\right)$$

where $F_N$=New filter output $F_{N-1}$=Filter output last execution=filter output after last new measurement $A_{N-1}$=Actuator position at last execution $\Delta T$=Elapsed time since a new value was communicated The use of an actual indication of the response to the control signal can help improve the accuracy of the disclosed techniques, both during periods of periodic communications and after a period of non-periodic or lost communications from the PID control element to the downstream element, e.g., an actuator. But the transmission of the actual response indication will typically require additional communication between a field device and the controller, if implemented in different devices. Such communications may be wireless, as described above, and therefore be susceptible to unreliable transmissions or power constraints. Other reasons may also lead to the unavailability of the feedback data.

As described below, the disclosed techniques can also address situations in which such response indications are not communicated in a periodic or timely manner. That is, application of the disclosed techniques need not be limited to the absence of measurement updates for the process variable. Rather, the disclosed techniques may be advantageously utilized to address situations involving the absence of other response indications, such as the position of an actuator or the output of a downstream control element. Still further, the disclosed techniques may be utilized to address situations involving the loss, delay or other unavailability of transmissions from the controller (or control element) to the downstream element, such as a field device (e.g., actuator) or another control element (e.g., cascaded PID control, splitter, etc.).

The wireless or other unreliable transmission of additional data to the controller or control element (i.e., the response indication or downstream element feedback), or from the controller or control element (i.e., the control signal), provides additional potential for communication issues and/or problems. As described above, feedback from the downstream element (e.g., actuator) may be involved in determining the integral contribution (or other control parameter or contribution). In this exemplary embodiment, the control routine relies on two feedback signals rather than the single process variable fed back in the embodiments described above. And if the control signal never reaches the downstream element, the process will not receive the benefit of the control scheme. Transmissions of either one of these signals may be delayed or lost and, thus, the techniques described herein address either eventuality.

The absence of the response indication involved in the filter or other control computations may be addressed by maintaining the filter output (or other control signal component) until an update is received. The filter output (or other control signal component) may then be modified in accordance with the expected process response over the time since the last update and the last feedback value of the downstream element, e.g., valve position.

When the control signal does not reach the downstream element, the response indication (i.e., feedback) from the downstream element will not be changing. In such cases, the lack of a change in value may trigger logic in the controller (or control element) to similarly maintain the filter output (or other control signal component) until a change in value is received.

The disclosed techniques may also be implemented in scenarios where actual feedback data is either not desired or unavailable. The former case may be advantageous in those situations where the simplicity of using an implied response to the control signal is beneficial. For instance, the communication of the actual feedback data may be problematic or impractical. The latter case may involve actuators or other devices not configured to provide position measurement data, as described above. Older devices may not have such capabilities.

Figure 8:
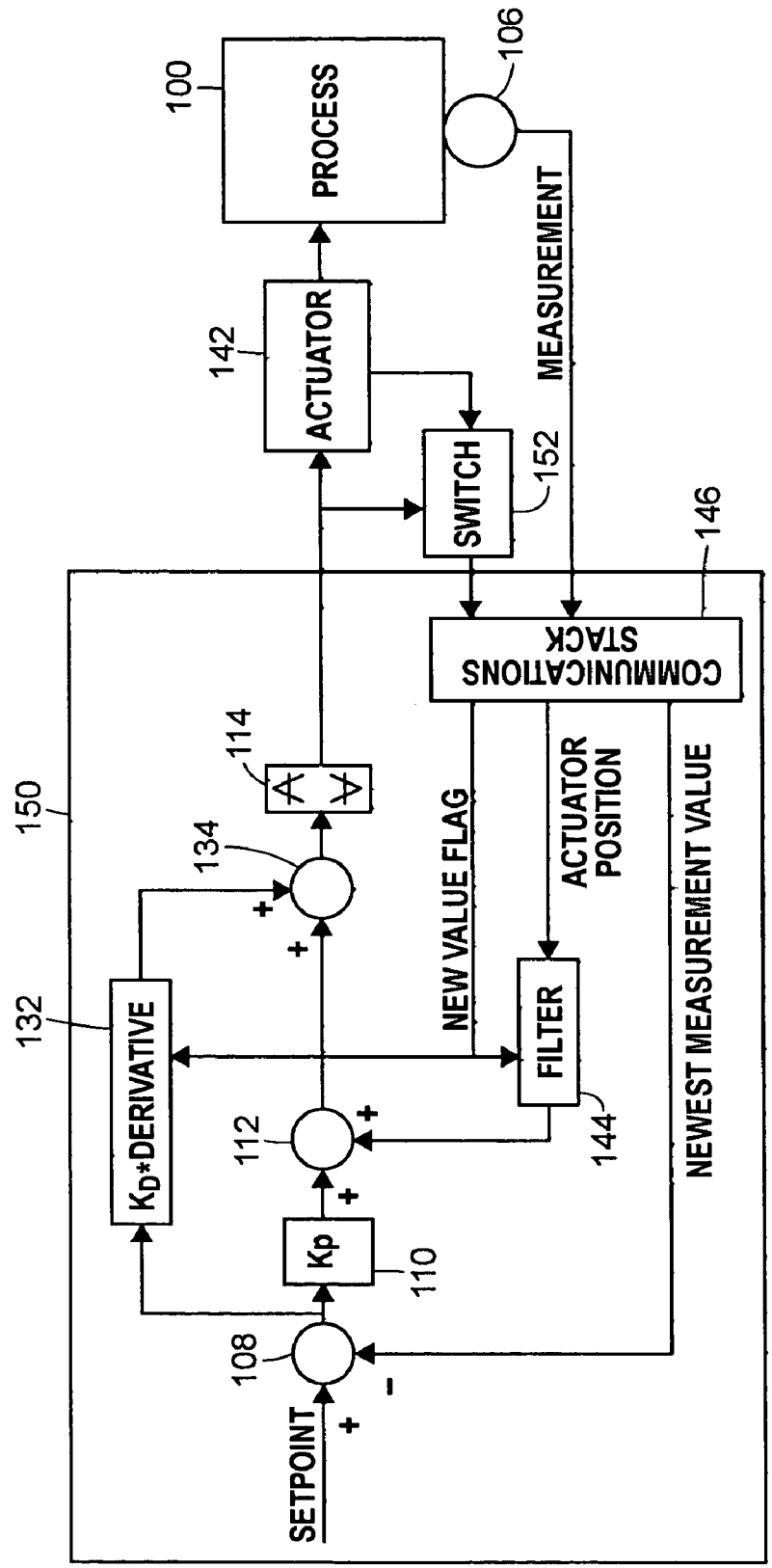

To accommodate such devices, a switch or other device may be provided to allow either an implied or actual response indication to be used by the disclosed techniques. An exemplary embodiment is shown in FIG. 8. As shown, a controller 150 may be coupled to a switch 152, which in turn receives both the implied and actual response indications. In this case, the controller 150 may be identical to any of the above-described controllers, inasmuch as the implementation of the disclosed control schemes is not dependent upon knowing the type of response indication. The switch 152 may be implemented in software, hardware, firmware, or any combination thereof. Control of the switch 152 may be independent of the controller 150 and the implementation of any control routine. Alternatively or additionally, the controller 150 may provide a control signal to configure the switch 152. In other embodiments, the switch 152 may be implemented as a part of the controller itself and, in some cases, be integrated as a part of the communications stack or other portion of the controller.

In any of the foregoing embodiments, the controllers may utilize a time stamp or other indication of time upon receipt of a measurement update. In these cases, any one or more of the feedback contributions discussed above may then be modified in accordance with the time stamp rather than use of the update flag to determine the time that the measurement update was received. This may be useful when the time of receipt is significantly different than the measurement time due to, for instance, a delivery delay. Delivery delays may arise from a variety of causes, including, for instance, a wireless transmission having to travel between a number of nodes or repeaters. Each node or repeater may introduce a finite delay even when conditions for transmission and reception are suitable. During adverse conditions, the nodes or repeaters may have a store, hold and release sequence (or other procedure) to facilitate the successful transmission of the data. For these reasons, the delivery or other delays may vary to a significant extent. The time stamps can also help avoid the errors that would otherwise arise from the varying delays.

In embodiments utilizing time-stamped data, the feedback contributions determine the elapsed time parameter ($\Delta T$) as the difference between two successive time stamps. That is, the elapsed time parameter is determined by calculating the difference in the time values indicated by the time stamps received with two successive measurement update communications.

In some cases, the controller may elect not to use the time stamps communicated with the measurement updates. For instance, if the data is published at an appropriate time during each periodic execution of the control routine, then the controller may determine that significant delay has not occurred, and then utilize the execution period to determine the elapsed time parameter.

The same techniques for analyzing an incoming communication may be utilized to determine whether the time of receipt may be relied upon to determine the elapsed time parameter.

As shown by the above-described embodiments, the feedback, filter or other routine responsible for determining the expected process response to the control signal may involve any type of model, network or other arrangement of process control elements that help remove any offset or other error from the remainder of the process control routine. In this way, the disclosed techniques are well suited for a variety of different processes, and are not limited to those that exhibit first-order behavior. Quite to the contrary, the disclosed techniques are applicable in contexts in which different models, filters or blocks are involved in determining the expected process response, and need not be limited to use in situations where the process model is highly accurate.

As described above, the disclosed techniques support a process control configuration that avoids the need for oversampling process variables, thereby facilitating the use of wireless communications and other transmitter scenarios where measurement values may not be available regularly or as often as the control execution period. In short, the disclosed techniques avoid having to constantly transmit measurement data for process control routine execution. As a result of the disclosed changes in the transmitter (or other field device) design and control modifications, measurement values are generally transmitted to only communicate significant changes (from the last communicated value) or after a refresh time. As a result, both the frequency of the transmitter communications and the amount of power used for data transmission drop significantly.

In accordance with some aspects of the disclosure, the techniques described herein may be applied in contexts in which a number of different wireless (or other) communications between the controller and the field device(s) or other elements of the process control system are undesirably delayed or lost. Accordingly, the foregoing examples regarding communication problems between the controller and a transmitter, and between a controller and an actuator, have been set forth with the understanding that they are exemplary in nature. Furthermore, the parameters involved in the communications are not limited to process variables being controlled by the control routine. On the contrary, the disclosed techniques may be applied in connection with communications involving any parameter being measured or fed back or otherwise communicated for use by the control routine. As a result, the response indications described above (i.e., a process variable measurement and an actuator position) are set forth with the understanding that they are exemplary in nature. Communication problems involving other data indicative of a response to the control signal may also be addressed by the disclosed techniques. As a result, any communication of data from an element (e.g., field device, another process control routine, etc.) downstream of the control routine may be involved.

In some (but not all) cases, the power consumption of the transmitting device may also be the reason for the lack of communication. In other cases, conserving power utilized for data transmission will not be an issue, as is the case with field devices requiring large amounts of power for other purposes, such as actuation. Nonetheless, communications may be lost, delayed, intermittent, non-regular or otherwise unavailable due to undesirable environment factors or other adverse conditions, as described above, or for any other reason, including, for instance, heavy data traffic loads on a wireless network.

Practice of the disclosed methods, system and techniques is not limited to any one particular wireless architecture or communication protocol. Suitable exemplary architectures and communication support schemes are described U.S. patent application Ser. No. 11/156,215 entitled "Wireless Architecture and Support for Process Control Systems," which was filed on Jun. 17, 2005, the entire disclosure of which is hereby incorporated by reference. In fact, the disclosed modifications to the control routines are well-suited for any context in which the control routine is implemented in a periodic manner, but without process variable measurement updates for each control iteration. Other exemplary contexts include where a sampled value is provided irregularly or more seldom by, for instance, an analyzer or via lab samples.

Practice of the disclosed technique is not limited to use with single-input, single-output PI or PID control routines, but rather may be applied in a number of different multiple-input and/or multiple-output control schemes and cascaded control schemes. More generally, the disclosed technique may also be applied in the context of any closed-loop model-based control routine involving one or more process variables, one or process inputs or other control signals, such as model predictive control (MPC).

The term "field device" is used herein in a broad sense to include a number of devices or combinations of devices (i.e., devices providing multiple functions, such as a transmitter/actuator hybrid), as well as any other device(s) that perform(s) a function in a control system. In any event, field devices may include, for example, input devices (e.g., devices such as sensors and instruments that provide status, measurement or other signals that are indicative of process control parameters such as, for example, temperature, pressure, flow rate, etc.), as well as control operators or actuators that perform actions in response to commands received from controllers and/or other field devices.

When implemented, any of the software described herein may be stored in any computer readable memory such as on a magnetic disk, a laser disk, or other storage medium, in a RAM or ROM of a computer or processor, etc. Likewise, this software may be delivered to a user, a process plant or an operator workstation using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

While the present invention has been described with reference to specific examples, which are intended to be illustrative only and not to be limiting of the invention, it may be apparent to those of ordinary skill in the art that changes, additions or deletions may be made to the disclosed embodiments without departing from the spirit and scope of the invention.

The invention claimed is:

1. A method of controlling a process with a control signal, the method comprising:
   implementing iterations of a control routine to generate the control signal;
   when an indication of a response to the control signal is unavailable, maintaining a feedback contribution to the control signal over one or more of the iterations of the control routine; and
   modifying the feedback contribution upon receiving the response indication;
   wherein modifying the feedback contribution comprises determining an elapsed time between a new update of the response indication and a previous update of the response indication if a new update of the response indication has been received and modifying the feedback contribution using the elapsed time.

2. The method of claim 1, wherein the feedback contribution is a reset contribution.

3. The method of claim 1, wherein the feedback contribution is a derivative contribution.

4. The method of claim 1, wherein modifying the feedback contribution further comprises determining the elapsed time based on a difference between times of receipt for the new update of the response indication and the previous update of the response indication.

5. The method of claim 1, wherein modifying the feedback contribution further comprises determining the elapsed time based on time stamps associated with the new update of the response indication and the previous update of the response indication.

6. The method of claim 1, wherein the response indication is a measurement of a process parameter controlled by the control routine.

7. The method of claim 6, wherein the process parameter is a process variable controlled by a field device responsive to the control signal.

8. The method of claim 1, wherein:
   the control routine is a proportional-integral-derivative (PID) control routine for controlling a process variable in accordance with a set point;
   the feedback contribution is generated by one of the integral and derivative components of the PID control routine; and,
   the response indication comprises a measurement of either the process variable or a process parameter responsive to the control signal to control the process variable.

9. The method of claim 1, wherein the control routine implements a model predictive control (MPC) scheme such that the feedback contribution is based on a process model response.

10. The method of claim 1, further comprising monitoring a new value flag to determine when the indication of the response to the control signal is unavailable.

11. The method of claim 10, wherein maintaining the feedback contribution comprises calculating a reset contribution based on the new value flag.

12. The method of claim 11, wherein calculating the reset contribution comprises utilizing feedback from a downstream element to determine the reset contribution.

13. The method of claim 12, wherein calculating the reset contribution further comprises maintaining the reset contribution if a changed value of the feedback from the downstream element is not received when expected.

14. The method of claim 1, further comprising receiving the response indication via a wireless transmission.

15. The method of claim 1, further comprising transmitting the response indication to facilitate modifying the feedback contribution once the response indication is available.

16. The method of claim 1, wherein the iterations of the control routine are event-triggered.

17. The method of claim 1, wherein the iterations are periodic.

18. A device for controlling a process with a control signal, the device comprising:
   a processor;
   a communication interface to receive an indication of a response to the control signal; and,
   a computer-readable medium in which a control routine is stored for execution by the processor to generate the control signal;
   wherein the control routine is configured to:
   determine a contribution to the control signal based on the response indication;
   maintain the control signal contribution over one or more iterations of the control routine when the response indication is not received by the communication interface;
   determine an elapsed time between a new update of the response indication and a previous update of the response indication if a new update of the response indication has been received; and
   update the control signal contribution with a feedback contribution using the elapsed time.

19. The device of claim 18, wherein the communications interface is configured to receive the response indication via a wireless transmission.

20. The device of claim 18, wherein the feedback contribution is a reset contribution.

21. The device of claim 18, wherein the feedback contribution is a derivative contribution.

22. The device of claim 18, wherein the control routine is configured to determine the elapsed time based on time stamps associated with the new update of the response indication and the previous update of the response indication.

23. The device of claim 18, wherein the control routine is configured to implement a model predictive control (MPC) scheme such that the feedback contribution is based on a process model response.

24. The device of claim 18, wherein the control routine is configured to monitor a new value flag to determine when the indication of the response to the control signal is unavailable.

25. The device of claim 24, wherein the control routine is configured to determine a reset contribution based on the new value flag and feedback from a downstream element.

26. A process control system for use in controlling a process based on a receipt of non-periodic updates of an indication of a response to a control signal of the process, the process control system comprising:

a computer readable medium; and a control module routine stored on the computer readable medium to be executed by a processor, the control module routine when executed being responsive to the updates of the response indication to generate a control signal for controlling the process, the control module routine including;

a first routine that executes to determine a contribution to the control signal based on the updates of the response indication;

a second routine that executes to maintain the control signal contribution over one or more iterations of the control module routine when the response indication is not received;

a third routine that executes to determine an elapsed time between a new update of the response indication and a previous update of the response indication if a new update of the response indication has been received; and a fourth routine that executes to update the control signal contribution with a feedback contribution using the elapsed time.

* * * * *